United States Patent [19]

Farrell

[11] 4,019,849

[45] Apr. 26, 1977

[54] RAPID PARISON COOLING IN INJECTION BLOW MOLDING

[75] Inventor: John Jerome Farrell, Greenbrook, N.J.

[73] Assignee: Consupak, Inc., Morristown, N.J.

[22] Filed: Oct. 31, 1975

[21] Appl. No.: 627,508

[52] U.S. Cl. .................. 425/445; 425/DIG. 208; 425/DIG. 215
[51] Int. Cl.² ........................ B29C 17/07
[58] Field of Search .... 264/89; 425/384, DIG. 208, 425/DIG. 215, 445, 387 B

[56] References Cited
UNITED STATES PATENTS

| | | | |
|---|---|---|---|
| 3,149,373 | 9/1964 | Marzillier | 425/384 |
| 3,594,862 | 7/1971 | Seefluth | 425/DIG. 208 |
| 3,776,991 | 12/1973 | Marcus | 425/DIG. 215 |
| 3,882,213 | 5/1975 | Uhlig | 425/DIG. 208 |
| 3,910,746 | 10/1975 | Mrusek et al. | 425/DIG. 208 |

FOREIGN PATENTS OR APPLICATIONS 486,302  2/1970  Switzerland ............. 425/DIG. 208

Primary Examiner—Richard B. Lazarus
Attorney, Agent, or Firm—Marvin Feldman; Stephen E. Feldman

[57] ABSTRACT

An injection molded parison is slightly preblown from the core rod and cooling water is then circulated both externally and internally on the parison so as to effect a rapid temperature decrease in the parison. The internal circulating cooling water initially passes through the core rod and then into contact with the parison. After circulating the water, a drying fluid is then circulated into contact with the parison to remove residual water. The method and apparatus of this invention are useful in controlling the cooling of certain thermoplastic parisons in which rapid cooling is necessary to achieve the desired crystal growth for subsequent biaxial or multiaxial orientation.

13 Claims, 6 Drawing Figures

RAPID PARISON COOLING IN INJECTION BLOW MOLDING

This invention relates to temperature conditioning an injection molded parison. Specifically this invention relates to rapidly cooling a parison on a core rod to a desired temperature for subsequent blow molding so as to achieve multiaxial orientation.

Heretofore in injection blow molding it was known to circulate water within a core rod on which a parison had been injection molded to cool the parison. This approach was rather inefficient as it necessitated heat transfer through the core rod itself. It was also known to allow the parison to cooldown in an air evironment to a desired temperature for subsequent biaxial orientation in blow molding. This approach was also often found to be too time consuming in that air is considered a poor conductor of heat and the thermal conductivity of the parison is relatively low.

Further in injection blow molding with certain thermoplastics such as polypropylene, it is necessary to rapidly cool the thermoplastic parison so as to achieve the desired crystal growth within a limited time without forming undesirably large crystals. With the advent of high speed injection blow molding machines, this need for rapid parison cooling has become even more apparent.

It has now been found that such rapid parison cooling is possible by the direct application of a cooling fluid to the parison while the parison is on a core rod within a mold.

It is therefore an object of this invention to provide a method and apparatus for rapidly cooling an injection molded parison for subsequent blow molding.

It is also an object of this invention to provide a method and apparatus for rapidly cooling a parison to a desired temperature so as to achieve multiaxial orientation in subsequent blow molding.

It is a further object of this invention to provide a method and apparatus wherein a cooling fluid directly contacts a parison and after cooling is achieved, the fluid is removed from the surface of the parison.

It is still a further object of this invention to provide a method and apparatus as aforesaid wherein a parison on a core rod within a mold is simultaneously cooled by cooling fluids on the inside and outside surfaces of the parison.

It is still a further object of this invention to provide a method and apparatus as aforesaid and in which a core rod alternatively supplies cooling fluid, drying fluid or blowing fluid to the inside of the parison.

It is still a further object of this invention to provide a method and apparatus as aforesaid in which the core rod and parison reside in a partible blow mold and wherein the partible sections of the mold contain means for circulating a cooling fluid along the outside surface of the parison.

It is still a further object of this invention to provide a method and apparatus as immediately aforesaid and in which the closed partible sections of the mold are in fluid tight relationship so as to contain the cooling fluid in contact with the parison.

It is still a further object of this invention to provide a method and apparatus for rapidly cooling an injection molded polypropylene parison to obtain desired crystal growth for subsequent blow molding to achieve multiaxial orientation.

The aforesaid as well as other objects and advantages which will become subsequently apparent in a reading of the construction and operation as more fully described hereinafter and claimed, reference being had to the accompanying drawing forming a part hereof, and in which:

Figure 1:
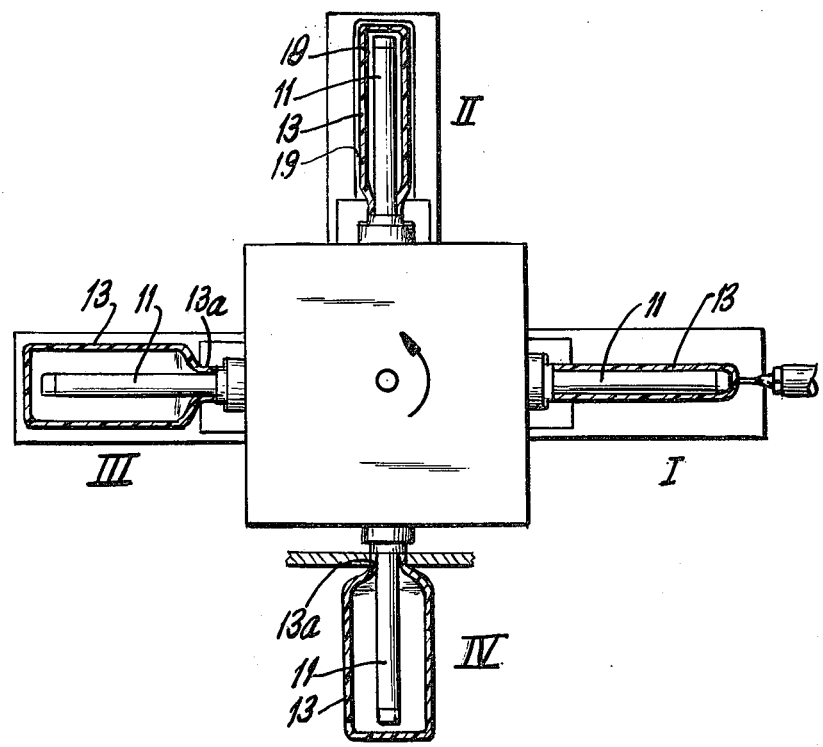
FIG. 1 is an overall top sectional view of the apparatus of this invention as used in a four-station injection blow molding machine.

Referring to FIG. 1 there is shown a four station injection blow molding machine comprising injection station I; rapid cooling station II; blow station III; and stripping station IV.

A horizontally rotatable indexing head 12 rotates core rod 11 (typical) in the direction of the arrow, from station I through IV, and back to I to repeat the injection blow molding cycle. At stations I, II and IV, there are the conventional injection mold; blow mold and stripper, respectively. In operation, the parison 13 is injection molded at station I, slightly preblown to compensate for shrinkage and then rapidly cooled at station II, blow molded to flow a finished hollow article such as container 13c at station III, and then stripped from the core rod 11 at station IV.

This invention however is more particularly related to the apparatus and method of station II as described hereinafter.

Figure 3:
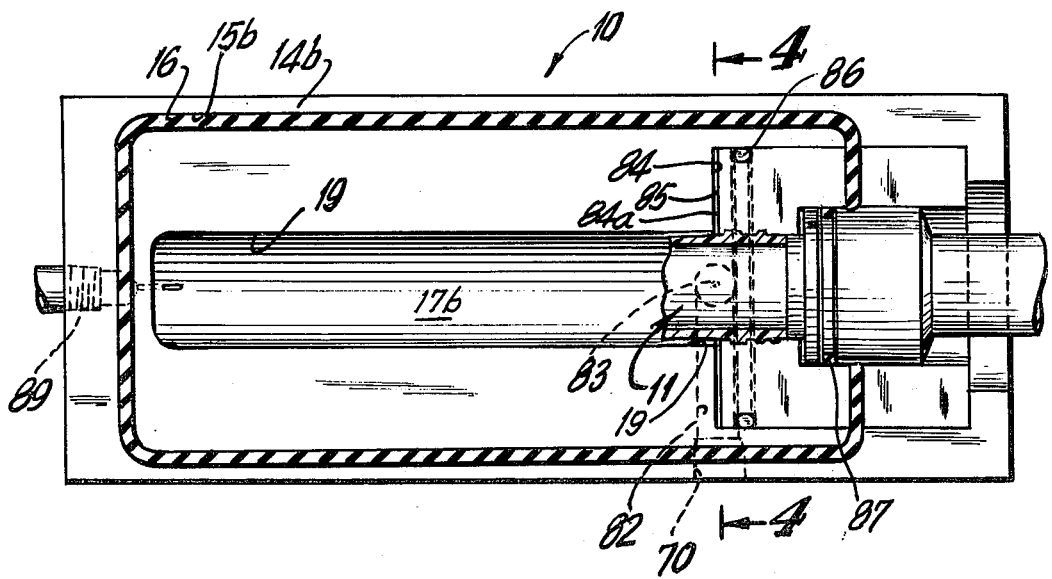
FIG. 3 is a sectional view of the apparatus of FIG. 2 along the mold split line 3—3.
Figure 2:
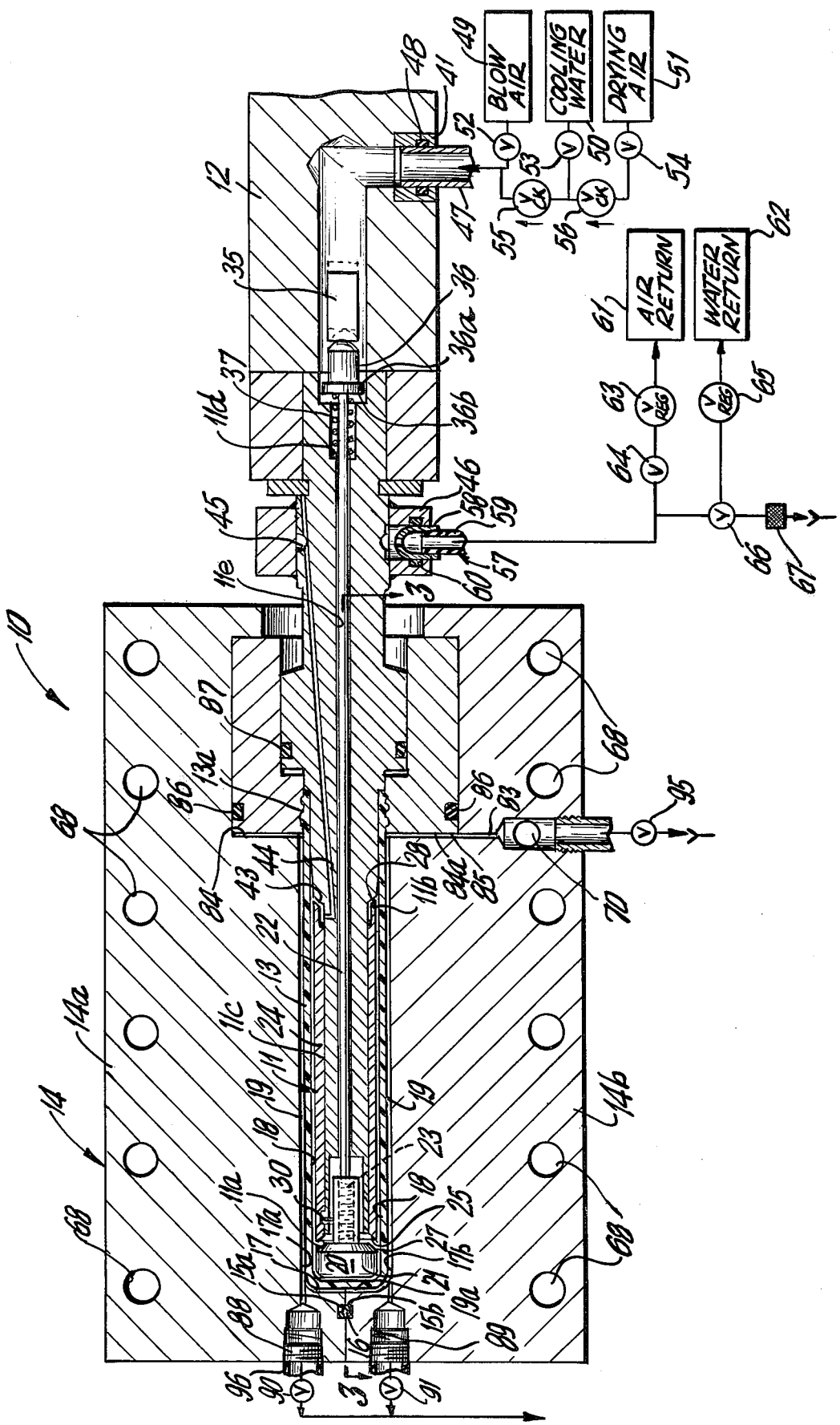
FIG. 2 is a sectional elevational view of the apparatus of this invention with a schematic illustration of the fluent system.
Figure 4:
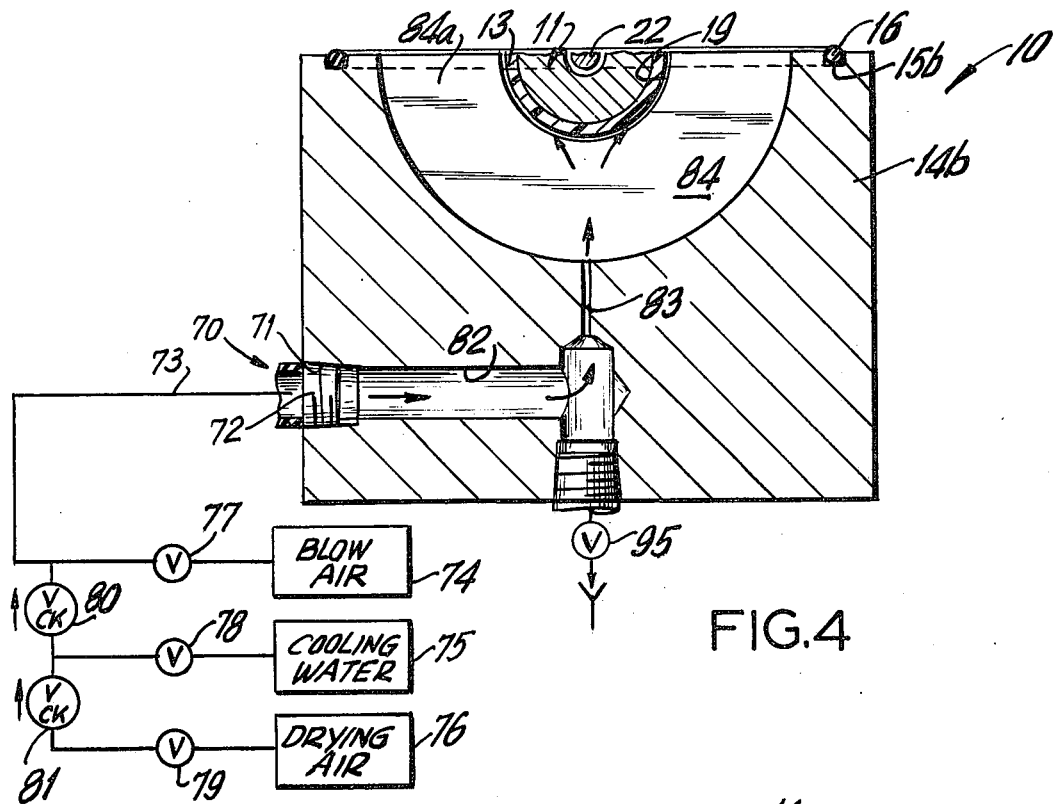
FIG. 4 is a partial sectional view taken along line 4—4 of FIG. 3.

Referring to FIGS. 2 and 3, there is shown the apparatus for rapid cooling of the parison generally designated as 10. The apparatus 10 comprises in general a tubular core rod 11 supportably fixedly mounted to horizontally rotatable indexing head 12, said core rod 11 being positioned with a partible mold 14.

Partible 14 comprises a top section 14a and opposed bottom section 14b. Sections 14a and 14b are formed with opposed annular grooves 15a and 15b respectively, which grooves 15a, 15b house O-ring 16, for purposes which will be described more fully hereinafter. Mold 14 with sections 14a and 14b closed form a mold cavity 17, formed of cavity sections 17a, 17b. Said mold cavity 17 is larger than the overall dimensions of parison 13 such that a first fluid channel 18 may be provided between core rod 11 and parison 13, and a second fluid channel 19 may be provided between parison 13 and mold sections 14a, 14b, for reasons hereinafter appearing.

Figure 5:
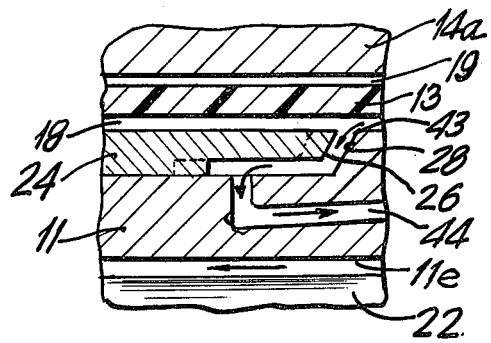
FIG. 5 is an enlarged sectional view of a portion of FIG. 2.
Figure 6:
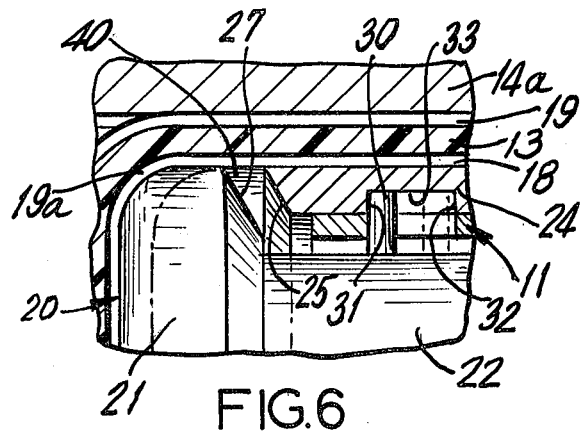
FIG. 6 is an enlarged sectional view of a portion of FIG. 2.

Referring now to FIGS. 2, 5 and 6, core rod 11 generally comprises a free end portion 11a, and a neck end portion 11b. Further core rod 11 is formed with an axial bore 11e along the length of the core rod and into which is mounted valve 20 which comprises a valve head 21, a slidable stem 22 to which is integrally mounted by threads 23, a pin 30 connected to stem 22 and a sleeve 24 slidably movable by pin 30. Sleeve 24 is slidable to a limited degree along surface 11c of core rod 11. Also sleeve 24 is formed with a free end taper 25 and a neck end taper 26. Valve head 21 is likewise formed with a taper 27 at its base, which taper 27 opposes taper 25 to form fluid inlet channel 40. Further the core rod neck portion 11b is formed with taper 28 which opposes sleeve taper 26, so as to form fluid outlet channel 43. When stem 22 is moved, pin 30 is concommitantly moved so as to abut shoulder 31 or shoulder 32 of internal sleeve groove 33.

In moving stem 22 in the free end direction, valve head 21 first moves away from sleeve 24 so as to form fluid inlet channel 40 and then pin 30 abuts shoulder 31 (FIG. 6) to cause sleeve 24 to likewise move so as to form fluid outlet channel 43 (FIG. 5). Contrariwise in moving stem 22 in the neck end direction, valve head 21 abuts sleeve 24 closing off inlet channel 40 and pin 30 abuts should 32 thereby causing sleeve 24 to concommitantly move in the neck end direction until sleeve 24 abuts core rod shoulder 28 thus closing off outlet channel 43, and placing the core rod in a closed mode. This latter mode was employed during injection molding of the parison at station I so as to prevent thermoplastic from entering the aforesaid fluid channels.

The aforesaid stemmed valve is actuated by a trigger bar mechanism generally shown as 35, which is more fully described in U.S. Pat. No. 3,836,305 granted Sept. 17, 1974. Trigger 35 is made to reciprocate in two positions; the closed position being shown in broken line in FIG. 2. Stem 22 is threaded at the neck end so as to receive adjustable nut 36 with integrally connected flange 36a. A compression spring 37 contacts face 36b of flange 36a and also contacts core rod face 11d at the other end so as to be seated therebetween. In the valve open position, spring 37 is compressed and a fluid flow channel is formed between the trigger bar, nut and stem, and the core rod and indexing head as shown by the headed arrows. In the valve closed position, spring 37 is uncompressed and channels 40 and 43 are closed as previously discussed.

Clearly once the trigger bar mechanism is deactuated, the compression spring 37 expands to return the stem 22 and pin 30 in the neck end direction thus closing inlet 40 and outlet 43.

When trigger bar mechanism 35 is actuated to move nut 36 and stem 22 in the free end direction, inlet channel 40 and outlet channel 43 are opened and in communication through channel 18.

Having established a continuous fluid flow inlet channel in the valve open position, as can be seen in FIG. 2 and particularly in FIGS. 5 and 6, there is also contiguous fluid flow outlet channel 43 connecting with core rod channel 44 to annular channel 45 and to fluid exit nozzle, generally 46. That is, in the valve open position, fluid is supplied from nozzle 41, through the core rod 11, to inlet 40 then to the channel 18 between the core rod and parison (with the molded parison neck portion 13a against the core rod providing a seal for fluid flow), and then to outlet 43 out through the core rod at 44, to outlet nozzle 46.

Inlet supply nozzle 41 is sized to receive inlet conduit 47 and a fluid tight seal is maintained therebetween by O-ring 48. As shown schematically, inlet conduit 47 communicates with three fluid supply systems, namely the blow air supply, 49; the cooling water supply, 50; and the dry air supply, 51. A set of solenoid valves 52, 53 and 54, as well as check valves 55 and 56 permit selective communication of one of the three supply systems with the inlet for flow through the core rod, between the core rod and parison to contact the parison and then out through the core rod to outlet nozzle 46.

Outlet nozzle 46 is sized to receive outlet conduit 57 comprising a machined head 58 and a flexible semi-rigid rubber hose 59. Head 58 is in fluid tight relationship with nozzle 46 by means of O-ring 60. As shown schematically conduit 57 is selectively interconnected to either air return system 61 or water return system 62 by means of air pressure regulating valve 63, air solenoid valve 64, water pressure regulating valve 65, two-way valve 66, water trap 67. By selectively setting valves 63 and 65 to pressures suitable for admitting air and water, respectively, and by having valve 64 open for air and closed for water, and by having valve 66 open to 62 for water, and then turning valve 66 open to 67 to trap water in the return air, air or water may be selectively returned from service contact with the internal surface of the parison.

Referring now to FIGS. 2-6, for a discussion of the external parison cooling, there are shown a serious of drilled holes 68 (typical) in mold sections 14a and 14b. Cooling fluid such as water may be passed through the holes to assist in cooling the parison 13 during operation at station II. Further and of particular relevance to the present invention is direct contact cooling of the external surface of the parison.

Inlet nozzle 70 is formed in the lower mold section 14b and is disposed below and transverse to the core rod cavity. Nozzle 70 is threaded at 71 to receive threaded connector 72 connected to piping conduit 73. Conduit 73 is selectively connected to one of three supply systems, namely blow air supply 74, cooling water supply 75 and drying air supply 76 by means of solenoid valves 77, 78, 79 and check valves 80 and 81. By this means of arrangement, similar to that for internal parison fluid flow, a specific fluid is selectively fed to contact the external surface of the parison. In achieving this, the selected fluid enters (arrows FIG. 3) mold section 14b at nozzle 71, through horizontal channel 82, vertical channel 83 and then between opposed faces 84 and 85 forming channel 84a, then to channel 19 running the length of the parison. The inflowing fluid is prevented from exiting from mold sections 14a, 14b by split O-ring 86; and is further prevented from exiting passed the parison and core rod at the neck end by core rod O-ring 87.

The entering fluid circulates through the entire channel 19 and is permitted to flow out of the channel through top mold section nozzle 88 and bottom mold section nozzle 89.

As shown schematically, adjustable needle valves 90 and 91 are connected to nozzles 88 and 89 respectively, and are sized so that valve 90 has a significantly greater orifice than valve 91. This sizing is to ensure that end channel portion 19a circulates fluid, particularly so when the fluid is cooling water. Valves 90 and 91 are in turn interconnected to a fluid recovery system similar to that as indicated by elements 61-67.

In this manner of construction and arrangement fluid circulating through channel 19, 19a passes primarily out through nozzle 88 or to a lesser degree through nozzle 89 and then to a recovery system for possible recirculation to supply systems 74, 75 or 76.

To drain cooling water from the channel 19, valve 91 remains open and valve 95 is opened. Valve 95 communicates with the fluid inlet channels 82 and 83 and is disposed at the bottom of mold section 14b and is axially transversely disposed to the core rod. Water is thus permitted to drain at the free end by means of nozzle 89 and valve 91 and at the neck end by means of (opened) valve 95. Water exiting from valve 95 may be recovered in an appropriate manner or may be fed to a drain for disposal.

To insure that the fluid in channel 19 remains therein, an O-ring 16 is provided in annular grooves 15a and 15b. It is to be borne in mind that in indexing, mold section 14a moves away from mold section 14b and O-ring 16 remains in bottom mold section 14b.

Further insofar as top section 14a is movable, conduit 96 to nozzle 88 should be flexible material. Also it has been found that with changes in mold temperature there are expansional variations which further necessitated flexible conduits as at 59, by way of example.

In operation, a parison is first injection molded at station I in an injection mold. The injection molded parison is then transferred to station II whereat a limited quantity of blow air under pressure is fed from supply 49 to the inside of the parison through the aforedescribed channels, so as to cause the parison to partially blow. This partial blow, (a) compensates for shrinkage of the cooling parison on the core rod, and (b) forms fluid flow channels 18 and 19.

Once channels 18 and 19 are so formed, internal and external parison cooling with direct contact of cooling water are commenced simultaneously.

Further the cooling water is circulated through the mold sections through holes 68.

In supplying internal cooling water, valves 52 and 54 are closed, and the pressurized cooling water supply 50 such as a pump, is actuated and trigger bar 35 remains actuated to open valve head 21. Cooling water then flows through the core rod, through inlet 40, into channel 18, through outlet 43, through core rod channel 18, through outlet 43, through core rod channel 44, out nozzle 57, through open valve 66 to water recovery system 62; valve 64 being closed. Water recovery system 62 may of course comprise a heat exchanger, filter, pump and piping as is required. As it is desirable to use distilled water as a cooling fluid, such recovery systems are also desired to insure a clean water supply.

In supplying external cooling water, valves 77 and 79 are closed, and valve 78 is open. Pressurrized cooling water supply 75, such as a pump is actuated, causing water to flow through inlet nozzle 70 to channels 82, 83, 84a, to channel 19 into contact with the parison and then out nozzles 88 and 89 to a recovery system, and is recovery in a manner similar to that aforedescribed.

Initially when 40° F cooling water contacts the hot parison of from about 400° F to 600° F, the water vaporizes and the latent heat of vaporization as well as the sensible heat cools the parison to orientation temperature of from about 200° to about 300° F, depending of course on the particular polymer.

Once the desired temperature is reached, the internal and external cooling water valves 53 and 78, respectively are closed, and the drying air valves 54 and 79, respectively are opened. Drying air, being air under relatively lower pressure and having a low absolute humidity is supplied to those same channels as the cooling fluid was supplied. The dry air evaporates residual water, particularly the water on the parison surface and mold cavity walls. This further vaporization cools the parison somewhat further.

The dry air now laden with moisture, is passed out nozzle 57 and (primarily) nozzle 88, respectively, to respective air recovery systems in which the air is filtered, dried and returned to the air supply system. By way of example, moisture laden air from nozzle 57 passes through valve 64 (opened) with valve 66 closed to 62 but open to 67, so that water is trapped at 67 and the air is passed to air recovery system 61. In a like manner, moisture laden air from nozzles 88 and 89 is so treated.

It is of course to be understood that while the aforedescribed embodiment discloses water as the cooling fluid, other suitable fluids, including vapors and liquids inert to the parison thermoplastic may be employed. It is also within the contemplation of this invention that the drying fluid, may be in addition to dry air, inert gases such as nitrogen, argon and the like as well as solvents for water but inert to the parison thermoplastic.

While the aforedescribed method and apparatus may be used for any thermoplastic in which rapid cooling is desirable, the application to polypropylene orientation is most suitable and desirable. Polypropylene, in comparison to most thermoplastics, has a relatively low thermal conductivity of about 0.09 BTU/hr. ft-°F and a relatively low thermal diffusivity of about 1.64 sq. ft./hr ($+ 10^{-3}$). In addition it is most desirable, in polypropylene orientation to rapidly cool the parison so as to arrest the crystal growth, at a desired crystal structure. This rapid fixing of the polypropylene crystal growth when orientated provides most desirable physical properties. Contact cooling of the polypropylene parison particularly on both sides of the parison, achieves the desired rapid cooling to the orientation temperature.

It is thus within the contemplation of this invention to cool a polypropylene parison in the aforedescribed mode, from an injection molding temperature of about 400° F to an orientation temperature of 280° F in about 10–15 seconds, with a subsequent period of time of about 30 seconds for full temperature equalization throughout the parison depending upon the parison thickness. Cooling periods of from about 10 to about 50 seconds for polypropylene orientation are within the contemplation of this invention.

It is also within the contemplation of this invention to provide contact cooling of the parison on either the internal surface or the external surface without performing both cooling modes either simultaneously or alternatively, although the latter modes are also feasible.

It is still further contemplated by this invention to provide the apparatus and method as aforesaid in a multi-station injection blow molding machine, wherein the cooling mode as described herein is carried out as the parison and core rod are rotated to a vertically angularly displaced position in an inactive (non-molding) mode during rotation of the indexing head, and once parison cooling is complete the core rod and parison are rotated back to the horizontal active (molding) mode for blow molding and stripping.

Although the invention has been described and illustrated in detail, it is to be clearly understood that the same is by way of illustration and example only and is not be taken by way of limitation, the spirit and scope of this invention being limited only by the terms of the appended claims.

What is claimed is:

1. An apparatus for cooling a parison having a neck portion and a close-ended tubular body portion comprising a core rod having the parison extending substantially the entire length thereof and the parison being supported at the neck portion, a mold in which the core rod and parison are situated with a space between the parison body portion and the core rod and a space between the parison body portion and the mold, the core rod comprising means to circulate a first cooling fluid in the space between the core rod and parison along substantially the entire inside surface of the parison body portion, and the mold comprising means to circulate a second cooling fluid in the space between the parison and the mold along substantially the entire outside surface of the parison body portion, said two cooling fluid means being operable at about the same time so that said parison body portion is spaced from the core rod and the mold by the two cooling fluids.

2. The apparatus of claim 1, said core rod further comprising means for removing the first cooling fluid and said mold comprising means for removing the second cooling fluid.

3. The apparatus of claim 2, wherein said cooling fluids comprise liquids and said core rod further comprising means to circulate a first drying fluid after removing the first cooling liquid, and said mold further comprising means to circulate a second drying fluid after removing the second cooling liquid, so as to remove residual amounts of cooling liquids from the parison.

4. The apparatus of claim 1, said means to circulate said first cooling fluid comprising a conduit in said core rod.

5. The apparatus of claim 4, wherein said conduit being interconnected with means to circulate a first drying fluid.

6. The apparatus of claim 5, wherein said conduit is further interconnected to means to provide blow air to said parison.

7. The apparatus of claim 1, wherein said mold comprises a partible split mold having an upper section disposed above said core rod said sections being partible and a lower section disposed below said core rod, and wherein said lower section comprises means for introducing said second cooling fluid and wherein said sections each comprise means for removing the second cooling fluid.

8. The apparatus of claim 7, further comprising a fluid seal between the closed section of the mold so as to contain the circulating fluid.

9. The apparatus of claim 1, said means to circulate said first fluid cooling fluid comprising a conduit in said core, wherein said mold comprises a partible split mold having an upper section disposed above the core rod said sections being partibe and a lower section disposed below the core rod, and wherein said lower section comprises means for introducing said second cooling fluid and wherein said sections each comprise means for removing the second cooling fluid.

10. The apparatus of claim 1, further comprising a rotatable indexing support table to which the core rod is mounted, said means for circulating said second cooling fluid comprising means for introducing the second cooling fluid and means for removing cooling the second cooling fluid each of said fluid introducing and removing means comprising nozzle means disconnectably connected to said table so that said nozzles are disconnected during rotation.

11. The apparatus of claim 10, said nozzle means removing said cooling fluid being located more adjacent the mounted end of the core rod than the nozzle means for introducing cooling fluid and further comprising a flexible tubing connected to said nozzle means for removing the cooling liquid.

12. An apparatus for cooling a parison on a core rod comprising a core rod having a closed-ended parison thereon, said core rod having a neck end and a free end, and being supported at the neck end and being unsupported at the free end, said core rod being horizontally disposed, a mold having a cavity in which the core rod and parison are situated, the walls of said mold cavity and the outside of said parison forming a continuous channel along the length of the parison and around the closed-end of the parison, means to circulate a cooling fluid through said channel wherein said mold being a partible split mold having an upper section disposed above the core rod and a lower section disposed below the core rod, and wherein said means to circulate a cooling fluid comprising means for introducing said cooling fluid in said lower section and means for removing said cooling fluid in the upper section so that said cooling fluid flows upwardly in said continuous channel, so as to cool said parison to a desired temperature for subsequent blow molding.

13. The apparatus of claim 12, further comprising means for circulating a drying fluid after circulation of the cooling fluid to remove residual cooling fluid from the surface of the parison.

* * * * *